(12) United States Patent
Ho et al.

(10) Patent No.: US 8,922,487 B2
(45) Date of Patent: *Dec. 30, 2014

(54) SWITCHING BETWEEN A FIRST OPERATIONAL MODE AND A SECOND OPERATIONAL MODE USING A NATURAL MOTION GESTURE

(71) Applicant: Google Inc., Mountain View, CA (US)

(72) Inventors: Casey Kwok Ching Ho, Burnaby (CA); Sharvil Nanvati, Dundas (CA)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,498

(22) Filed: Nov. 12, 2013

(65) Prior Publication Data

US 2014/0071166 A1    Mar. 13, 2014

Related U.S. Application Data

(63) Continuation of application No. 12/821,422, filed on Jun. 23, 2010, now Pat. No. 8,581,844.

(51) Int. Cl.
*G06F 3/033* (2013.01)
*G09G 5/00* (2006.01)
*G06T 19/00* (2011.01)
*G06F 1/16* (2006.01)
*G06F 3/01* (2006.01)

(52) U.S. Cl.
CPC ............ *G06T 19/006* (2013.01); *G06F 1/1626* (2013.01); *G06F 3/011* (2013.01); *G06F 2200/1637* (2013.01)
USPC ........... 345/158; 345/156; 345/629; 345/632; 345/633

(58) Field of Classification Search
None
See application file for complete search history.

(56) References Cited

U.S. PATENT DOCUMENTS

| | | | |
|---|---|---|---|
| 6,933,923 B2 | 8/2005 | Feinstein | |
| 7,002,551 B2* | 2/2006 | Azuma et al. | 345/158 |
| 7,159,194 B2* | 1/2007 | Wong et al. | 715/863 |
| 7,401,300 B2 | 7/2008 | Nurmi | |

(Continued)

FOREIGN PATENT DOCUMENTS

WO    03/077087 A2    9/2003

OTHER PUBLICATIONS

International Search Report and Written Opinion, PCT/US2011/041436, dated Oct. 7, 2011.

*Primary Examiner* — Dismery Mercedes
(74) *Attorney, Agent, or Firm* — Troutman Sanders LLP; James E. Schutz; Jay R. Anderson, Jr.

(57) ABSTRACT

A mobile device is operative to change from a first operational mode to a second or third operational mode based on a user's natural motion gesture. The first operational mode may include a voice input mode in which a user provides a voice input to the mobile device. After providing the voice input to the mobile device, the user then makes a natural motion gesture and a determination is made as to whether the natural motion gesture places the mobile device in the second or third operational mode. The second operational mode includes an augmented reality display mode in which the mobile device displays images recorded from a camera overlaid with computer-generated images corresponding to results output in response to the voice input. The third operational mode includes a reading display mode in which the mobile device displays, without augmented reality, results output in response to the voice input.

20 Claims, 5 Drawing Sheets

(56) References Cited

U.S. PATENT DOCUMENTS

| | | |
|---|---|---|
| 8,228,292 B1 | 7/2012 | Ruiz et al. |
| 8,581,844 B2 * | 11/2013 | Ho et al. .................. 345/158 |
| 8,730,312 B2 * | 5/2014 | Roebke et al. ................ 348/61 |
| 2002/0044152 A1 * | 4/2002 | Abbott et al. ................ 345/629 |
| 2002/0186132 A1 | 12/2002 | Kruger |
| 2006/0038833 A1 | 2/2006 | Mallinson et al. |
| 2007/0004451 A1 * | 1/2007 | C. Anderson ............... 455/556.1 |
| 2008/0259094 A1 | 10/2008 | Kim et al. |
| 2009/0002391 A1 | 1/2009 | Williamson et al. |
| 2009/0225026 A1 | 9/2009 | Sheba |
| 2009/0225040 A1 * | 9/2009 | Whytock ..................... 345/173 |
| 2009/0262074 A1 * | 10/2009 | Nasiri et al. ................. 345/158 |
| 2011/0084913 A1 * | 4/2011 | Wirtanen ..................... 345/173 |
| 2013/0162665 A1 * | 6/2013 | Lynch .......................... 345/589 |

\* cited by examiner

SWITCHING BETWEEN A FIRST OPERATIONAL MODE AND A SECOND OPERATIONAL MODE USING A NATURAL MOTION GESTURE

This Application is a continuation application claiming priority under 35 U.S.C. §120 to U.S. patent application Ser. No. 12/821,422, filed 23 Jun. 2010, the entire contents and substance of which is incorporated by reference as if fully set out below.

BACKGROUND OF THE INVENTION

Augmented reality is an intuitive and convenient way for displaying information to a user of a mobile device. Examples of mobile devices include a personal display assistant ("PDA"), a cellular phone, a portable digital music player, a laptop computer, or other mobile device. In general, augmented reality is a method of displaying both real-world environmental elements layered with computer-generated graphical elements. Using a mobile device, computer-generated information that is relevant to the environment may be displayed alongside or atop the actual environment so as to minimize interrupting an ongoing task or by minimizing the change in context and the amount of attention required from the user.

However, instructing a mobile device to display an augmented reality video or image can be an awkward process. For example, the mobile device may require that the user push a hardware or software button for switching between the standard operating functionality of the mobile device and an augmented reality mode. To complicate the switch, the mobile device may have tiny buttons that may or may not have tactile feedback for entering input. The mobile device may also have other challenging elements, such as requiring the user to open a cover or flip a switch. When the mobile device is being used in an ongoing activity, switching between entering input on the buttons of the mobile device and the augmented reality display mode can be a tiresome, strenuous, and annoying activity.

Although there are some existing arrangements that address switching between the standard functionality of the mobile device and the augmented reality mode, these existing arrangements require the user to locate and activate a software button or physical element to switch between modes. The requirement to press an additional button or screen element creates an interruption between the user's input and the output from the mobile device. Not only is the interruption jarring and not conducive to an ongoing task, but the user interaction of pressing an element itself is a suboptimal method for switching between modes.

SUMMARY OF THE INVENTION

A system and method for switching between an operational mode of a mobile device from a first operational mode to a second operational mode using a natural motion gesture is provided. In one implementation, the system includes a storage device operative to store a first set of baseline data representative of a first state of a mobile device and further operative to store a second set of baseline data representative of a second state of a mobile device. The system also includes an orientation sensor operative to detect a first orientation of the mobile device and output a first set of orientation data representative of the mobile device being in the first orientation. The orientation is further operative to detect a second orientation of the mobile device and output a second set of orientation data representative of the mobile device being in the second orientation.

The system also includes a processor operative to change the operational mode of the mobile device from a first mode to a second mode when the first set of orientation data approximates the first set of baseline data, and the second set of orientation data approximates the second set of baseline data. Moreover, the first operational mode comprises an input receiving mode operative to receive an input from a user, and the second operational mode comprises a visual display mode. The visual display mode is operative to display a selected portion of the real-world environment surrounding the mobile device overlaid with at least one computer-generated graphic element.

In one aspect of the system the first state of the mobile device comprises the mobile device being in the first operational mode and the input receiving mode comprises receiving a voice input from the user. In another aspect of the system, the second state of the mobile device comprises the mobile device being in the second operational mode.

In a further aspect of the system the first set of orientation data indicates that a front surface of the mobile device is positioned approximately against the head of the user. In yet another aspect of the system, the second set of orientation data indicates that a front surface of the mobile device is approximately perpendicular to a ground surface. In yet a further aspect of the system, the second set of orientation data indicates that a front surface of the mobile device forms an approximate acute angle to a ground surface.

In another aspect of the system, the memory storage device is further operative to store a third set of baseline data representative of a transition of the mobile device from the first state to the second state, and the orientation sensor is further operative to detect transitional orientations of the mobile device changing from first orientation to the second orientation, and output a third set of transitional data representative of the transitional orientations. In addition, the processor is further operative to change the operational mode of the mobile device from the first mode to the second mode when the third set of transitional data approximates the third set of baseline data.

In a further aspect of the system, the memory storage device is further operative to store transitional timing data representative of a duration of the mobile device changing from the first state to the second state, and the processor is further operative to acquire timing data representative of the mobile device changing from the first orientation to the second orientation. Moreover, the processor is further operative to change the operational mode of the mobile device from the first mode to the second mode when the timing data approximates the transitional timing data.

In yet another aspect of the system, the processor is further operative to output a result in response to the input received during the first operational mode, and the at least one computer-generated graphic element comprises a portion of the result output by the processor.

In yet a further aspect of the system, the selected portion of the real-world environment surrounding the mobile device is recorded in real-time. In another aspect of the system, the selected portion of the real-world environment surrounding the mobile device was previously recorded and stored in the storage device.

In one implementation, a method for switching between the operational mode of a mobile device from a first operational mode to a second operational mode using a natural motion gesture includes detecting, with an orientation sensor, a first orientation of the mobile device, outputting, with the orientation sensor, a first set of orientation data representative of a mobile device being in a first orientation, detecting, with the orientation sensor, a second orientation of the mobile device, and outputting, with the orientation sensor, a second set of orientation data representative of the mobile device being in the second orientation. The method further includes changing, with a processor, the operational mode of the mobile device from a first mode to a second mode when the first set of orientation data approximates a first set of baseline data representative of a first state of the mobile device and the second set of orientation data approximates a second set of baseline data representative of a second state of the mobile device. In addition, the first operational mode comprises an input receiving mode operative to receive an input from a user, and the second operational mode comprises a visual display mode operative to display a selected portion of the real-world environment surrounding the mobile device overlaid with at least one computer-generated graphic element.

In one aspect of the method, the first state of the mobile device comprises the mobile device being in the first operational mode, and the input receiving mode comprises receiving a voice input from the user. In another aspect of the method, the second state of the mobile device comprises the mobile device being in the second operational mode.

In a further aspect of the method, the first set of orientation data indicates that a front surface of the mobile device is positioned approximately against the head of the user. In yet another aspect of the method, the second set of orientation data indicates that a front surface of the mobile device is approximately perpendicular to a ground surface. In a further aspect of the method, the second set of orientation data indicates that a front surface of the mobile device forms an approximate acute angle to a ground surface.

In another aspect, the method includes detecting, with the orientation sensor, transitional orientations of the mobile device changing from the first orientation to the second orientation, outputting, with the orientation sensor, a third set of transitional data representative of the transitional orientations, and changing, with the processor, the operational mode of the mobile device from the first mode to the second mode when the third set of transitional data approximates a third set of baseline data representative of a transition of the mobile device from the first state to the second state.

In a further aspect, the method includes acquiring, with the processor, timing data representative of the mobile device changing from the first orientation to the second orientation, and changing, with the processor, the operational mode of the mobile device from the first mode to the second mode when the timing data approximates transitional timing data representative of a duration of the mobile device changing from the first state to the second state.

In yet another aspect, the method includes outputting, with the processor, a result in response to the input received during the first operational mode, wherein the at least one computer-generated graphic element comprises a portion of the result output by the processor.

In yet a further aspect of the method, the selected portion of the real-world environment surrounding the mobile device is recorded in real-time. In another aspect of the method, the selected portion of the real-world environment surrounding the mobile device was previously recorded and stored in the storage device.

DETAILED DESCRIPTION

Figure 1:
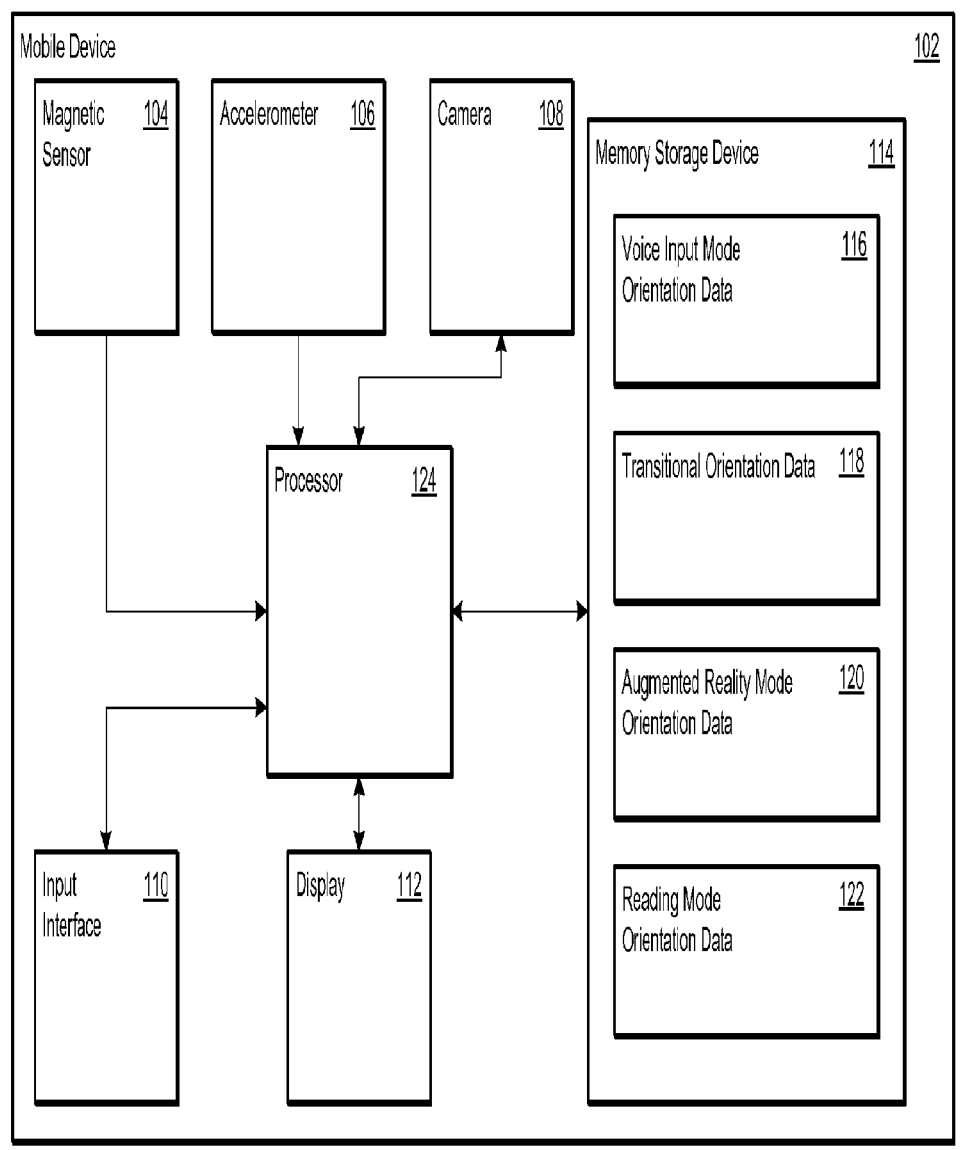
FIG. 1 illustrates one example of a mobile device configured to switch between operational modes.

FIG. 1 shows one example of a mobile device 102 in accordance with aspects of the invention. The mobile device 102 may be operative to switch between a voice input and a visual display mode, such as an augmented reality display mode or a reading display mode, using a natural motion gesture. Other operational modes are also possible. In one implementation, the mobile device 102 includes a magnetic sensor 104, an accelerometer 106, a camera 108, a processor 124, an input interface 110, a display 112, and a memory storage device 114.

The magnetic sensor 104 is operative to detect the magnetic field near the mobile device 102. The magnetic sensor 104 is one example of an orientation sensor employed by the mobile device 102 for determining the orientation of the mobile device 102. The magnetic sensor 104 may include a geomagnetism detection type electronic compass integrated circuit or other type of electronic compass. The magnetic sensor 104 may further include one or more magnetic sensors for detecting geomagnetism in three-dimensions, such as along an X-axis, a Y-axis, and a Z-axis. Moreover, the magnetic sensor 104 may include an arithmetic circuit for processing the signal from each sensor. In addition, the magnetic sensor 104 may output the magnetic measured values as 8-bit digital values to another component of the mobile device 102 for further processing, such as the processor 124. In one implementation, the magnetic sensor 104 is an AK8973, available from Asahi Kasei Microsystems Co., Ltd., headquartered in Tokyo, Japan.

The accelerometer 106 is operative to detect accelerations and motion of the mobile device 102. The accelerometer 106 is another example of an orientation sensor employed by the mobile 102 for determining the orientation of the mobile device 102. The accelerometer 106 may include a digital output 3-axis linear accelerometer packaged in a Land Grid Array ("LGA") package. The accelerometer 106 may further include a sensing element and an integrated circuit interface operative to process information from the sensing element and to output a signal representative of the movement of the mobile device 102 through an I$^2$C/SPI serial interface. The accelerometer 106 may be operative to detect the motion of the mobile device 102 through one or more dimensions, such as the X-axis, Y-axis, and Z-axis. In one implementation, the accelerometer 106 may be an LIS331DLH, available from STMicroelectronics, headquartered in Geneva, Switzerland.

The camera 108 is operative to capture images, such as video or still images, of the environment in which the mobile device 102 operates. The camera 108 may be operative to capture images in real-time or for storage and later retrieval. The camera 108 may be a digital camera operative to capture the video or the still images at a selected framerate, resolution, megapixel size, or other digital camera characteristic. The camera 108 may be further operative to output the images of the environment to the processor 124 for additional manipulation or processing. Moreover, the images recorded by the camera 108 may be displayed on the display 112 in real-time, or displayed on the display 112 at a later time when requested by the processor 124 or a user. In addition, the camera 108 may be activated based on a natural motion gesture of the mobile device 102. As explained below, when the camera 108 is activated by way of a natural motion gesture, the processor 124 may overlay computer-generated graphic elements on the images recorded by the camera 108 and display the resulting composite images on the display 112 as an augmented reality image and/or video.

The display 112 is operative to display images for the mobile device 102. The display 112 may be an interactive display, such as a capacitive or resistive display, and operative to receive input from the user when the user touches the display 112. The display 112 may also display images recorded by the camera 108 or display computer-generated graphic elements generated by the processor 124. Moreover, as mentioned above, the display 112 may be operative to display images recorded by the camera 108 overlaid with computer-generated graphic elements generated by the processor 124. In addition, when the camera 108 is activated by way of the natural motion gesture, the display 112 may also become active to display the images recorded by the camera 108 overlaid with the computer-generated graphic elements generated by the processor 124.

The input interface 110 is output to receive input from a user. The input interface 110 may be a touch-based interface, such as a keyboard or the display 112, or the input interface 110 may be an audio interface, such as a microphone. The input interface 110 may also be a combination of touch-based and audio-based interfaces. The input received by the input interface 110 may be sent to the processor 124 for additional processing. Moreover, the input received by the input interface 110 may cause the mobile device 102 to enter a first operational mode whereby the mobile device 102 is operative to receive voice and/or audio input via the input interface 110. For example, the input interface 110 may receive an input that instructs the processor 124 to start a selected mobile application, and the start-up of the mobile application may cause the mobile device 102 to enter this first operational mode.

The processor 124 is operative to process data sent by the components of the mobile device 102, such as the magnetic sensor 104, the accelerometer 106, the camera 108, and so forth. Moreover, the processor 124 may be operative to send output to one or more components of the mobile device 102 such as the memory storage device 114, the display 112, or other components of the mobile device 102.

The processor 124 may be further operative to implement a software-based orientation sensor for determining the orientation of the mobile device 102. For example, the magnetic sensor 104 and the accelerometer 106 may output their readings to the processor 124, which may then interpolate the data from the magnetic sensor 104 and the accelerometer 106 to determine the orientation of the mobile device 102. The processor 124 may be programmed or calibrated with a selected plane for determining the orientation of the mobile device 102, such as being programmed or calibrated with a horizontal plane and magnetic north. However, the processor 124 may alternatively be programmed or calibrated with another plane for determining the orientation of the mobile device 102, such as a vertical plane. As discussed below, the processor 124 may use the determined orientation of the mobile device 102 to determine whether a natural motion gesture has been made to switch the operating mode of the mobile device 102 from an input mode to an augmented reality mode. Depending on the information stored in the memory storage device 114, the processor 124 may make other determinations about changing the operating mode of the mobile device 102 as well.

In addition to making determinations about the orientation of the mobile device 102, the processor 124 may be further operative to determine when to make the orientation determinations. In one implementation, the processor 124 is operative to continuously make determinations about the orientation of the mobile device 102. For example, when the mobile device 102 is turned on (e.g., being used by the user), the processor 124 may be operative to determine the orientation of the mobile device 102 until the mobile device 102 is turned off or put into a non-operating mode, such as a hibernation mode or "sleep" mode.

Alternatively, the processor 124 may be operative to determine the orientation of the mobile device 102 at selected occurrences or between selected occurrences. An example of a selected occurrence is the initialization of a mobile application, such as the start of a mobile search application, a mobile web browser application, a mobile Global Positioning System ("GPS") navigation application, or other mobile application. In this implementation, the processor 124 may be operative to determine an initial orientation of the mobile device 102 when the mobile application is initialized. After the initialization of the mobile application, the processor 124 may then continuously make determinations about the orientation of the mobile device 102. In addition to starting the determinations of the orientation of the mobile device 102, a selected occurrence may stop the determinations of the orientation of the mobile device 102. For example, when the orientation of the mobile device 102 matches, or is approximate to, a previously programmed or calibrated orientation, the processor 124 may stop making the determinations of the orientation of the mobile device 102.

In yet a further implementation, the processor 124 may be operative to make determinations about the orientation of the mobile device 102 at selected time intervals. For example, the processor 124 may be operative to determine the orientation of the mobile device 102 at 5 millisecond intervals, 10 second intervals, or any other measurement of time intervals. In this implementation, the processor 124 may start the determinations of the mobile device 102 at the initialization of the mobile application and then, afterwards, determine orientations of the mobile device 102 at selected time intervals until a selected, second occurrence occurs that would stop the determinations of the orientations of the mobile device 102. As discussed below, the selected, second occurrence may include the initialization of a second mobile application or the determination that the orientation of the mobile device 102 matches, or is approximate to, a previously programmed or calibrated orientation.

The memory storage device 114 is operative to store one or more datasets 116/118/120/122 to assist the processor 124 in determining whether the user has made a natural motion gesture with the mobile device 102 that should cause the processor 124 to change the operational mode of the mobile device 102. The datasets 116/118/120/122 may represent data for three components that define a vector space in three dimensions. However, additional components are also possible. Moreover, the components that define the vector space may have a particular arrangement, such as by being orthogonal or approximately orthogonal. Other arrangements are also possible.

In one implementation, the memory storage device 114 is operative to store a first set of baseline data 116 representative of the orientation of the mobile device 102 in an input receiving mode, such as a voice input mode. The voice input mode of the mobile device 102 may be a mode in which the mobile device 102 accepts speech input via the input interface 110, where the input interface 110 may be a microphone or other audio input interface. A mobile application, such as a mobile search application or a mobile GPS navigation application, may use the speech input to perform a search requested by the user or to find a location requested by the user. Other operations using the speech input are also possible.

The first set of baseline data 116 represents a first state of the mobile device 102. The first state of the mobile device 102 may include any state of the mobile device 102, such as being in a selected operating mode, in a selected orientation, when a selected mobile application is initialized, when a selected mobile application is exited, or any combinations of states of the mobile device 102. In one implementation, the first state of the mobile device 102 is when the mobile device 102 is placed in a voice input operational mode. The mobile device 102 may enter the voice input operational mode when a mobile application is initialized. Alternatively, the mobile device 102 may enter the voice input operational mode when the mobile device 102 is in a selected orientation.

The first set of baseline data 116 may describe the first state of the mobile device 102 in terms of orientation. The first set of baseline data 116 may describe the orientation of the mobile device 102 in terms of pitch, yaw, roll or other types of orientation. As discussed above, the first set of baseline data 116 may include one or more components that are approximately orthogonal that define vectors in a three-dimensional space. In addition, the first set of baseline data 116 may be calibrated or configured such that the first state of the mobile device 102 is recognized as being in a state proximate to a user's head and mouth. For example, the memory storage device 114 may be initially programmed with a first set of baseline data 116 approximating the orientation of the mobile device 102 when placed next to a user's head and mouth, head and ear, or in another position for accepting speech or voice input from the user.

Moreover, the first set of baseline data 116 may represent the first state of the mobile device 102 at the time a mobile application is initialized. For example, the first set of baseline data 116 may represent the first state of the mobile device 102 as being in a state when a mobile search application is initialized. Furthermore, the first set of baseline data 116 may encompass more than one state of the mobile device 102, such as by including data representative of the mobile device 102 being in a state when a mobile application is initialized and then being in a selected orientation when, or after, the mobile application is initialized.

The memory storage device 114 may be further operative to store a second set of baseline data 120 representative of the mobile device 102 being in a second state. The second state of the mobile device 102 may include any state of the mobile device 102, such as being in a selected operating mode, in a selected orientation, when a selected mobile application is initialized, when a selected mobile application is exited, or any combinations of states of the mobile device 102.

In one implementation, the second state of the mobile device 102 is when the mobile device 102 is placed in a visual display mode, such as an augmented reality display mode. The mobile device 102 may enter the augmented reality display mode when a mobile application is initialized. Alternatively, the mobile device 102 may enter the augmented reality display mode when the mobile device 102 is in a selected second orientation. The second set of baseline data 120 may represent the mobile device 102 being in the selected second orientation. In one implementation, the second set of baseline data 120 approximates the mobile device 102 being in an orientation relatively perpendicular to a flat surface, such as the ground. The augmented reality display mode may include displaying an image on the display 112, where the image is being, or has been previously, recorded by the camera 108 overlaid with a computer-generated graphic element representative of an output, such as a search result, prepared in response to an input received during the voice input operational mode. As discussed below, in this implementation, the processor 124 may be operative to activate the camera 108 and the display 112 when the processor 124 determines that the orientation of the mobile device 102 approximates the orientation represented by the second set of baseline data 120.

The memory storage device 114 may be further operative to store a third set of baseline data 122 representative of the mobile device 102 being in a third state. The third state of the mobile device 102 may include any state of the mobile device 102, such as being in a selected operating mode, in a selected orientation, when a selected mobile application is initialized, when a selected mobile application is exited, or any combinations of states of the mobile device 102. In one implementation, the third state of the mobile device 102 is when the mobile device 102 is placed in another visual display mode, such as a reading display mode. The mobile device 102 may enter the reading display mode when a mobile application is initialized. Alternatively, the mobile device 102 may enter the reading display mode when the mobile device 102 is in a selected third orientation. In one implementation, the third set of baseline data 122 approximates the mobile device 102 being in an orientation forming an approximate acute angle with a flat surface, such as the ground. Moreover, the third set of baseline data 122 may approximate the mobile device 102 being in an orientation other than an orientation where the mobile device 102 is approximately perpendicular with a flat surface. The reading display mode may include displaying display one or more outputs on the display 112 in response to an input received during the voice input operational mode. The reading display mode may differ from the augmented reality display mode in that camera may not be activated 108 when the mobile device 102 is placed in the reading display mode. As discussed below, in this implementation, the processor 124 may be operative to active the display 112 when the processor 124 determines that the orientation of the mobile device 102 approximates the orientation represented by the third set of baseline data 122.

To facilitate the detection of the transition between the various operational modes, the memory storage device 114 may include transitional orientation data 118 representative of approximated transitional orientations that the mobile device 102 may take on as the mobile device 102 moves from one orientation for a first operational mode to a second orientation for a second operational mode. The transitional orientation data 118 may be based on calibrating the mobile device 102 with approximated orientations that the mobile device 102 may take on as it transitions between various operational modes. Alternatively, a user may calibrate the transitional orientation data 118 by moving the mobile device 102 through various orientations from the various operational modes and recording the orientations as the transitional orientation data 118. In another implementation, the transitional orientation data 118 may be programmed by interpolating the potential orientations that the mobile device 102 may take on as the mobile device 102 transitions orientations between operating modes.

Moreover, the transitional orientation data 118 may include various sets of transitional orientation data 118 based on the starting state and ending state of the mobile device 102.

For example, the transitional orientation data 118 may include a first set of transitional orientation data for the orientations that the mobile device 102 may take on as the mobile device 102 transitions between the voice input operational mode and the augmented reality display mode, and the transitional orientation data 118 may include a second set of transitional orientation data for the orientations that the mobile device may take on as the mobile device 102 transitions between the voice input operational mode and the reading display mode. The transitional orientation data 118 may also include a third set of transitional orientation data for the orientations of the mobile device 102 as the mobile device 102' transitions between the augmented reality display mode and the reading display mode, or vice versa. In other words, the transitional orientation data 118 may include any set of transitional orientation data as the mobile device 102 transitions from a first state to a second state.

Figure 2:
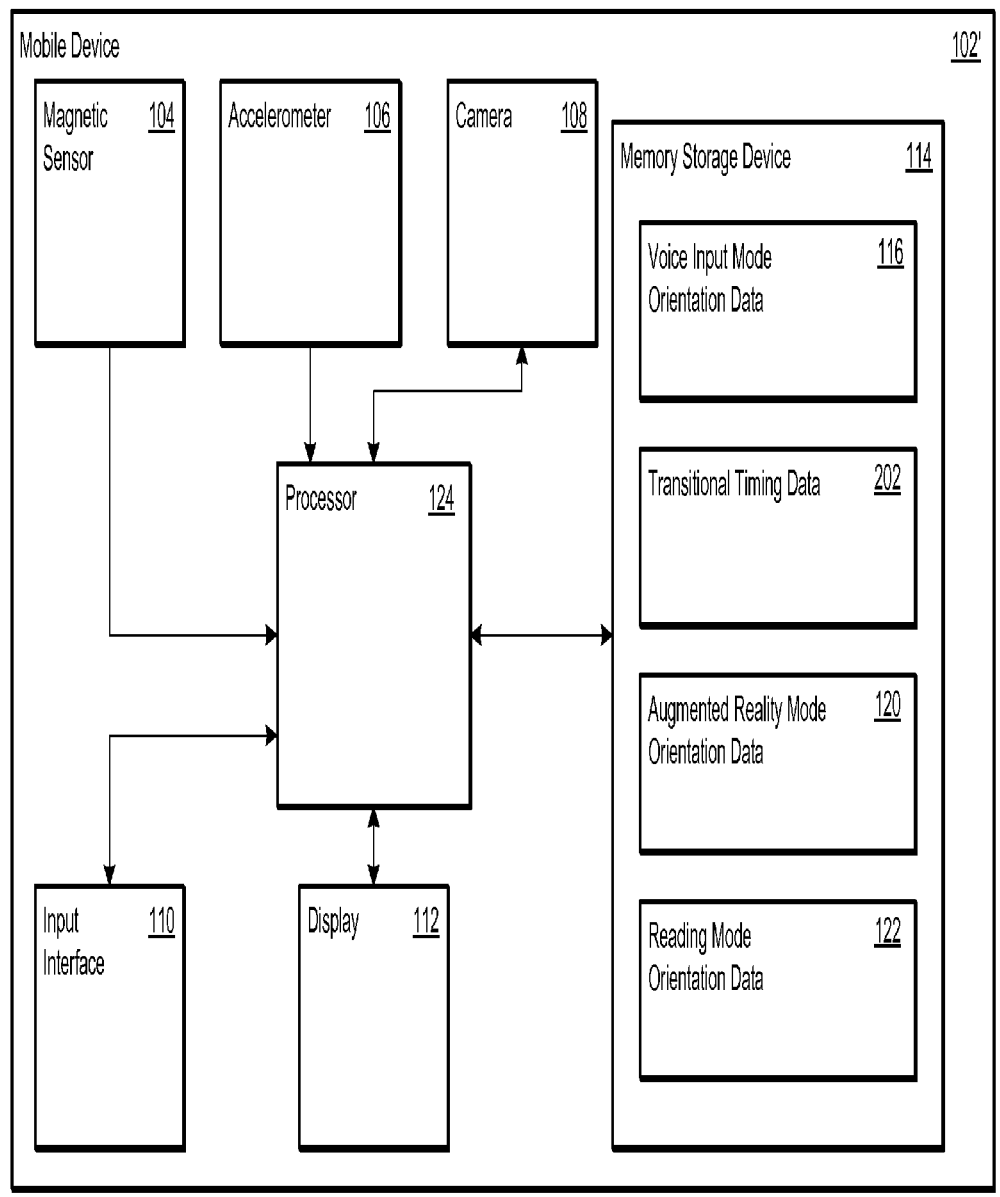
FIG. 2 illustrates an alternative example of a mobile device configured to switch between operational modes.

FIG. 2 illustrates an alternative example of the mobile device 102' operative to switch between the input receiving mode, such as the voice input mode and the visual display mode, such as the augmented reality display mode, based on a natural motion gesture. In the alternative example shown in FIG. 2, the memory storage device 114 includes a set of transitional timing data 202. The transitional timing data 202 may be used instead of, or in addition to, the transitional orientation data 118 of FIG. 1. The transitional timing data 202 may include timing information to assist the processor 124 in determining whether the mobile device 102' has switched between a first state and a second state.

The transitional timing data 202 may include timing data sets that represent approximate durations between various states. For example, the transitional timing data 202 may include a first set of timing data that represents the approximate duration that the mobile device 102' should spend in changing from the orientation of the voice input mode to the augmented reality display mode. In this first example, the first set of timing data may represent that the approximate duration between the voice input mode and the augmented reality display mode is five seconds. As a second example, the transitional timing data 202 may also include a second set of timing data that represents the approximate duration that the mobile device 102' should spend in changing from the orientation of the voice input mode to the reading display mode. In this second example, the second set of timing data may represent that the approximate duration between the voice input mode and the reading display mode is eight seconds. that the mobile device 102' should be in a second state ten seconds after leaving the first state.

Based on the foregoing two examples, the processor 124 may refer to the transitional timing data 202 to determine whether to switch the operational mode of the mobile device 102'. In one implementation, and with reference to the prior two examples, the processor 124 may first determine that the mobile device 102' is in the voice input mode and then, after an approximate five seconds, determine whether the mobile device 102' is in an approximate orientation for the augmented reality display mode. If the processor 124 determines that the mobile device 102' is in an approximate orientation for the augmented reality display mode, the processor 124 may change the operational mode of the mobile device 102' from the voice input mode to the augmented reality display mode. However, if the mobile device 102' is not in the approximate orientation for the augmented reality display mode, the processor 124 may then wait for an additional approximate three seconds to determine whether the mobile device 102' is in an approximate orientation for the reading display mode. If the processor 124 determines that the mobile device 102' is in an approximate orientation for the reading display mode, the processor 124 may switch the operational mode of the mobile device 102' from the voice input mode to the reading display mode. Additional sets of timing data may be added to the transitional timing data 202 for representing approximate durations between other states of the mobile device 102' as well.

With reference to FIGS. 1 and 2, the processor 124 may refer to the first baseline dataset 116 and the second baseline dataset 122 to determine whether a user has made a natural motion gesture to switch the operating mode of the mobile device 102. Determinations and actions applicable to the mobile device 102 may also be applicable to the mobile device 102' and vice versa. The processor 124 may compare the orientation of the mobile device 102 with the first baseline dataset 116 and the second baseline dataset 122. In one implementation, when a selected mobile application is initialized, the processor 124 may compare the orientation of the mobile device 102 with the first baseline dataset 116 to determine whether the mobile device 102 is in an orientation approximated by the first baseline dataset 116. The first baseline dataset 116 may further include delay timing information to account for a potential delay between the time the user initializes the mobile application and the time the user places the mobile device 102 in the orientation approximated by the first baseline dataset 116. Based on values provided by the magnetic sensor 104, the accelerometer 106, or other components of the mobile device 102, the processor 124 may determine that the orientation of the mobile device 102 approximates the orientation represented by the first baseline dataset 116.

In one implementation, when the processor 124 determines that the orientation of the mobile device 102 approximates the orientation of the orientation represented by the first baseline dataset 116 (e.g., the orientation of the mobile device 102 is adjacent to the user's head for receiving voice input data from the user), the mobile device 102 may then start monitoring the transitional orientations of the mobile device 102 as the user moves the mobile device 102 from the voice input mode orientation. During this transitional phase, the processor 124 may compare the transitional orientations of the mobile device 102 with the transitional orientation dataset 118 to confirm that the mobile device 102 is changing orientations that would place the mobile device 102 into an orientation approximated by the second baseline dataset 120, the third baseline dataset 122, or another dataset.

Should the transitional orientations of the mobile device 102 deviate from the orientations approximated by the transitional orientation dataset 118, the processor 124 may determine that the user is not moving the mobile device 102 through a natural motion gesture for placing the mobile device 102 in the augmented reality display mode or the reading display mode. However, should the transitional orientations of the mobile device 102 approximate the orientations represented by the transitional orientation dataset 118, the mobile device 102 may then determine whether the mobile device 102 should be placed in the augmented reality display mode or the reading display mode. The processor 124 may determine whether to place the mobile device 102 in the augmented reality display mode or the reading mode by first detecting that the mobile device 102 is no longer moving, such as by analyzing the data output by the accelerometer 106, and then comparing the resting orientation of the mobile device 102 with the orientation represented by the second baseline dataset 120 (e.g., the orientation for activating the augmented reality display mode) and/or comparing the resting orientation of the mobile device 102 with the orientation represented by the third baseline dataset 122 (e.g., the orientation for activating the reading display mode).

In another implementation, the processor 124 evaluates the transitional timing dataset 202 to determine whether to place the mobile device 102 in the augmented reality display mode, the reading display mode, another defined mode, or no mode at all. In this alternative implementation, after recognizing that the mobile device 102 is in the voice input mode and that the orientation of the mobile device 102 approximates the orientation represented by the first baseline dataset 116, the processor 124 may initialize and maintain a timer for determining when the processor 124 should next determine the orientation of the mobile device 102.

As previously discussed with reference to FIG. 2, and depending on the timing dataset associated with the augmented reality display mode and the reading display mode, when the timer does expire, the processor 124 may compare the orientation of the mobile device 102 with the orientation represented by the second baseline dataset 120 and/or the orientation represented by the third baseline dataset 122. Moreover, the order in which the processor 124 compares the orientation of the mobile device 102 with the orientations represented by the second baseline dataset 120 and the third baseline dataset 122 may be based on the durations of the transitional timing dataset 202 such that the processor 124 refers to the second baseline dataset 120 first and then the third baseline dataset 122, refers to the third baseline dataset 122 first and then the second baseline dataset 120, or refers to both datasets 120-122 substantially simultaneously. In addition, depending on the orientation of the mobile device 102 when the timer expires, the processor 124 may place the mobile device 102 into the augmented reality display mode, the reading mode, another defined mode, or no mode at all.

In yet a further implementation, the processor 124 may forego referring to the transitional orientation dataset 118 or the transitional timing dataset. For example, when the processor 124 determines that the mobile device is in the voice input mode and that the mobile device 102 has received voice input via the input interface 110, the processor 124 may begin polling the magnetic sensor 104 and the accelerometer 106 to determine if the mobile device 102 is placed into an orientation for the augmented reality display mode or the reading display mode. In this alternative implementation, the processor 124 may rely on orientation thresholds to determine that whether the mobile device 102 is moving, such as by comparing the orientation thresholds with the output from the magnetic sensor 104, the accelerometer 106, or other component, while the mobile device 102 is moving or changing orientations. When the outputs from the magnetic sensor 104, the accelerometer 106, or both, indicate that the mobile device 102 is sufficiently stable (e.g., not moving), the processor 124 may then compare the resting orientation of the mobile device 102 with the orientations represented by the second baseline dataset 120 and the third baseline dataset 122. Based on comparing the resting orientation with the orientations represented by the second baseline dataset 120 and the third baseline dataset 122, the processor 124 may place the mobile device 102 in the augmented reality display mode, the reading display mode, another mode, or no mode at all.

Figure 3A:
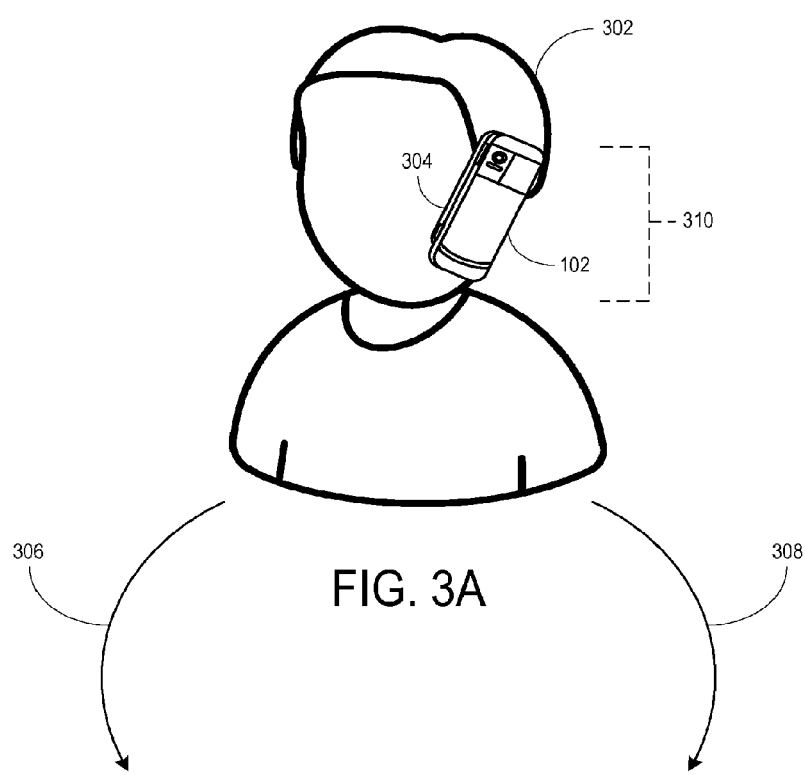
FIG. 3A illustrates an example of the mobile device of FIG. 1 in a first operational mode.
Figure 3B:
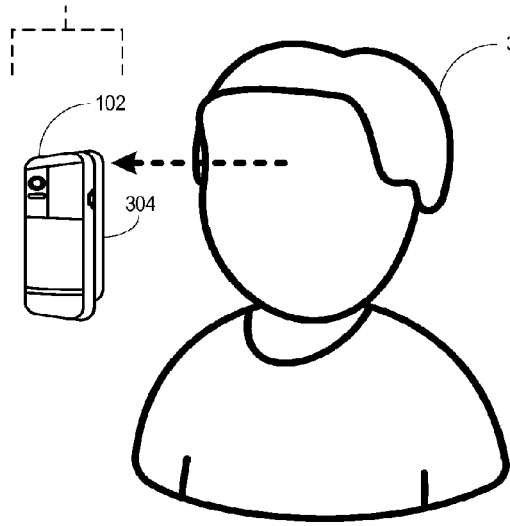
FIG. 3B illustrates an example of placing the mobile device of FIG. 1 in a second operational mode.
Figure 3C:
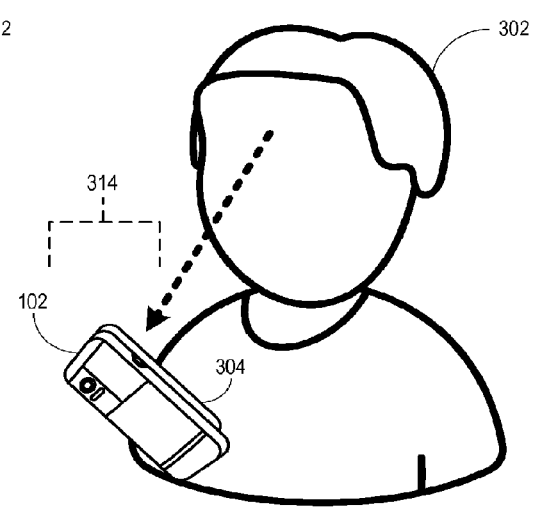
FIG. 3C illustrates an alternative example of placing the mobile device of FIG. 1 in a third operational mode.

FIGS. 3A-3C illustrate exemplary selected modes and orientations of the mobile device 102 for those operating modes relative to a user 302 of the mobile device 102. The arms and hands of the user have been omitted for clarity, but it should be noted that the user may be holding the device with his hand. FIG. 3A illustrates an example of the mobile device 102 in the voice input mode. In the voice input mode, a front surface 304 of the mobile device 102 is proximate to, or against, the side of the head of the user 302. The mobile device 102 may be in an orientation 310 conducive to providing voice input to the input interface of the mobile device 302.

After providing the voice input to the mobile device 102, the user 302 may change the operational mode of the mobile device 102 through a natural motion gesture that places the mobile device 102 into a previously configured or calibrated orientation. FIG. 3B illustrates an example of the mobile device 102 in an orientation 312 for switching the operational mode of the mobile device 102 to the augmented reality display mode. Arc 306 represents transitional orientations that the mobile device 102 may go through as the user 302 moves the mobile device 102 from the first orientation 310 to the second orientation 312. In the second orientation 312, the front surface 304 of the mobile device 102 may be placed approximately at eye level of the user 302. In addition, the front surface 304 of the mobile device 102 may be approximately perpendicular with a flat surface on which the user 302 is standing, such as the ground. When the processor 124 determines that the second orientation 312 is approximate to the orientation represented by the second baseline dataset 120, the processor 124 may switch the operating mode of the mobile device 102 from the voice input mode to the augmented reality display mode.

Turning next to FIG. 3C is an illustrated example of the mobile device 102 in an orientation 314 for switching the operational mode of the mobile device 102 to the reading display mode. Arc 308 represents transitional orientations that the mobile device 102 may go through as the user 302 moves the mobile device 102 from the first orientation 310 to a third orientation 314. In the third orientation 314, the front surface 304 of the mobile device 102 may be placed approximately at a location lower than the eye level of the user 302 and with the mobile device 102 slightly angled towards the user 302. In addition, the front surface 304 of the mobile device 102 may form an approximate acute angle with a flat surface on which the user 302 is standing, such as the ground. When the processor 124 determines that the third orientation 314 is approximate to the orientation represented by the third baseline dataset 122, the processor 124 may switch the operating mode of the mobile device 102 from the voice input mode to the reading display mode.

Figure 4:
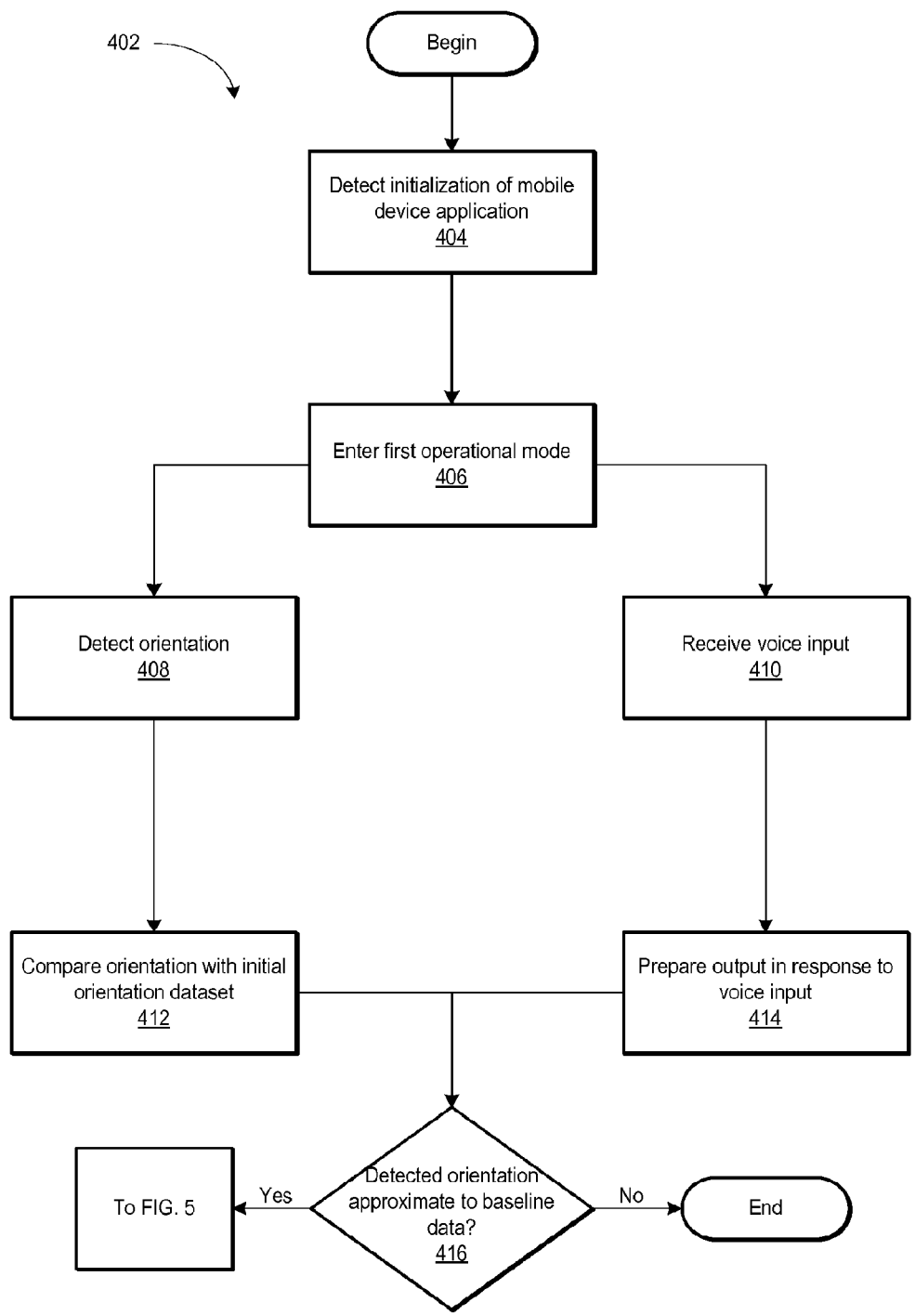
FIG. 4 illustrates one exemplary logic flow in accordance with aspects of the invention.

FIG. 4 illustrates one example of logic flow 402 of the mobile device 102 for switching between the voice input mode, the augmented reality display mode, and the reading display mode based on a natural motion gesture. Initially, the processor 124 may detect the initialization of a mobile device application, such as a search application, a GPS navigation application, or other application at block 404. The initialization of the mobile application may place the mobile device 102 in the first operational mode, such as the voice input mode at block 406. Alternatively, the detection by the processor 124 of the initialization of the mobile application may place the mobile device 102 in the first operational mode. After placing the mobile device 102 in the first operational mode, the processor 124 may then begin determining a first orientation of the mobile device 102 based on one or more outputs provided by the magnetic sensor 104, the accelerometer 106, any other component of the mobile device 102, or a combination of components at block 408.

While the processor 124 is detecting the orientation of the mobile device 102, the mobile device 102 may be in an input receiving mode such that the input interface 110 may be receiving an input from the user at block 410. In one implementation, the input received from the user is a voice input. However, it is possible that the input interface 110 may receive the voice input from the user before or after the processor 124 detects the orientation of the mobile device 102. Although the user may provide a voice input to the input interface 110 when the mobile device 102 is in the input receiving mode, the user may also provide other types of input, such as a tactile input when the user touches the display 112 of the mobile device 102, a textual input when the user uses a keyboard of the mobile device 102, or a combination of inputs.

Upon receiving the input, the input interface 110 may transmit the input to the processor 124 for use with the mobile application. As an example of an input that the user may provide to the mobile application is the name of a business, or the type of business, that the user desires to visit. Another example of an input that the user may provide is a subject matter input, such as where the user is searching for a particular thing, such as a particular shoe model, or a general thing, such as shoes in general. Yet a further example of an input that the user may provide is a mailing address, a specific location, such as a city name, or a generalized location, such as a region. Other types or combinations of inputs are also possible.

After receiving the input from the user, the processor 124 may prepare the output of the mobile application at block 414. An example of an output prepared by the mobile application is a set of businesses matching a business name, a business name matching an address, or a business name matching a subject matter, such as a shoe seller matching a search for the subject matter of shoes. Other types of output are also possible depending on the mobile application and the input provided by the user. The output from the mobile application may be buffered by the processor 124 or stored in the memory storage device 114 until the processor 124 has determined whether the mobile device 102 should be placed in a second or third operating mode. Alternatively, the processor 124 may transmit the output from the mobile application to the display 112 for viewing and review by the user.

After detecting the orientation of the mobile device 102, the processor 124 may compare the detected orientation with the first baseline dataset 116, which, in one implementation, may represent an orientation of the mobile device 102 for operating in a voice input operating mode. This is shown at block 412. By comparing the orientation of the mobile device 102 with the first baseline dataset 116, the processor 124 may be operative to determine whether the mobile device 102 should be placed in the first operating mode or whether the mobile device 102 is operating in the first operating mode. In block 416, the processor 124 may then make a determination whether the orientation of the mobile device 102 approximates the orientation represented by the first baseline dataset 116. As discussed previously with regard to FIG. 3A, the orientation of the mobile device 102 that approximates the orientation represented by the first baseline dataset 116 may be an orientation where the mobile device 102 is placed next to the head of the user such that the input interface 110 is proximate to the mouth of the user and an audio output interface, such as a speaker, is proximate to the ear of the user.

Although FIG. 4 illustrates one example of logic flow 102 where the processor 124 determines whether the orientation of the mobile device 102 approximates the orientation represented by the first baseline dataset 116 after receiving a voice input from the user, the processes of the logic flow 402 may be performed in one or more alternative sequences. For example, the processor 124 may be operative to first determine whether the orientation of the mobile device 102 approximates the orientation represented by the first baseline dataset 116 and then determine whether to place the mobile device 102 in the first operating mode. As another example, input interface 110 may first receive the input from the user and then the processor 124 may determine whether to place the mobile device 102 in the first operating mode. Other sequences of the processes shown in FIG. 4 are also possible.

Figure 5:
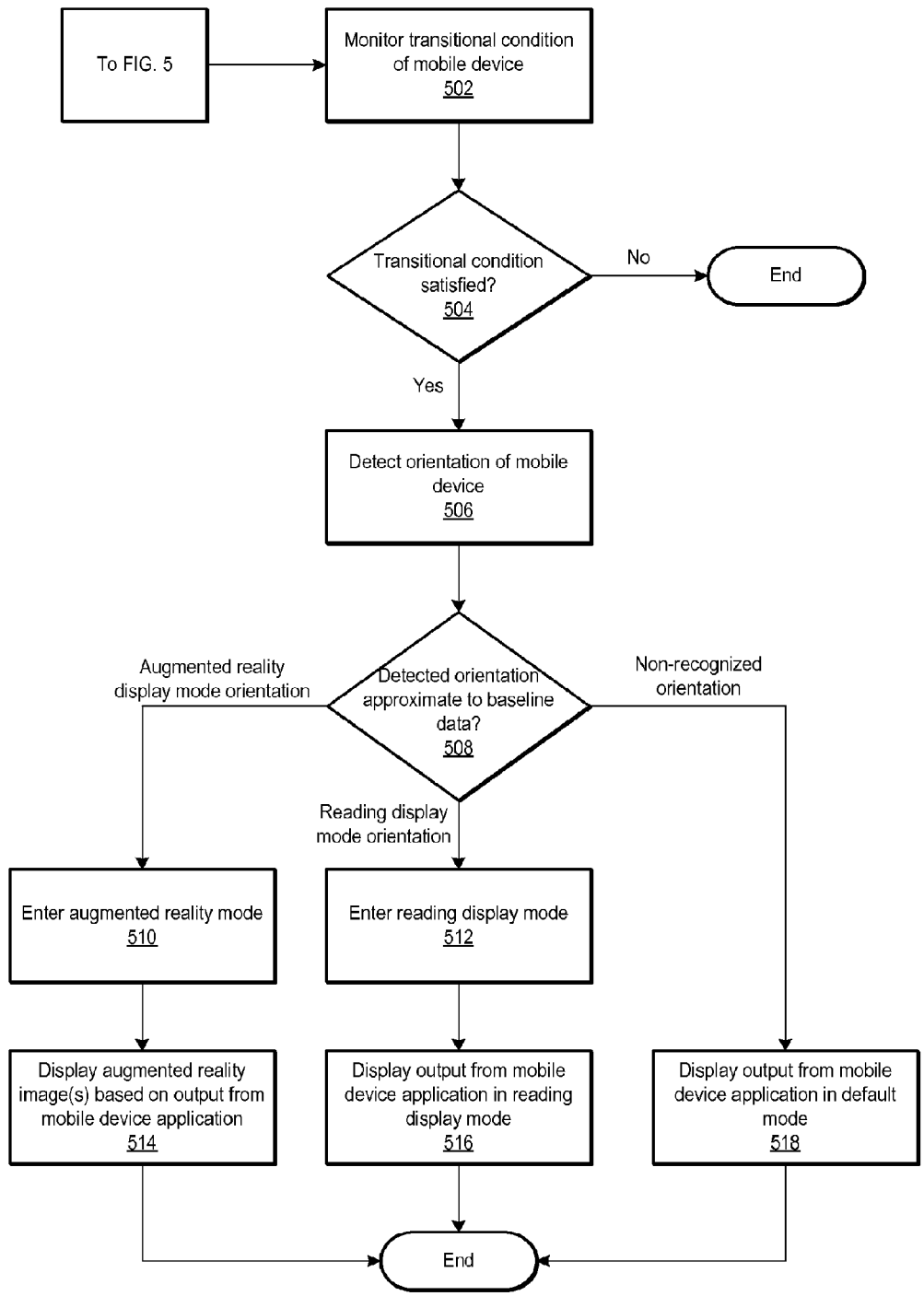
FIG. 5 illustrates a continuation of the logic flow from FIG. 4.

FIG. 5 continues the logic flow 402 from FIG. 4 where the orientation of the mobile device 102 approximates the orientation represented by the first baseline dataset 116. After determining that the orientation of the mobile device 102 approximates the orientation represented by the first baseline dataset 116, the processor 124 may monitor for a transitional condition of the mobile device 102 as shown in block 502. As discussed with reference to FIGS. 1 and 2, monitoring a transitional condition may include monitoring one or more transitional orientations as the user moves the mobile device 102 from the voice input mode orientation to another orientation, such as the augmented reality display mode orientation or the reading display mode orientation. Alternatively, as previously discussed, monitoring the transitional condition may include maintaining a timer based on a transitional timing dataset 202 or monitoring orientation data output by the magnetic sensor 104, the accelerometer 106, or other component, to determine whether the mobile device 102 has moved from the voice input mode orientation to another orientation.

The processor 124 may then determine whether the transitional condition has been satisfied at block 504. In one implementation, the transitional condition may be satisfied where the processor 124 determines that the transitional orientation of the mobile device 102 approximate the transitional orientations represented by the transitional orientation dataset 118. In another implementation, the transitional condition may be satisfied when the processor 124 determines that the time period represented by the transitional timing dataset 202 has elapsed. In yet another implementation, and depending on the setup of one or more orientation thresholds, the transitional condition may be satisfied when orientation data meets, exceeds, or falls below or one or more orientation thresholds.

After the transitional condition is satisfied, the processor 124 may then detect the orientation of the mobile device 102 at block 506, and then determine whether the detected orientation of the mobile device 102 approximates the orientations represented by the second baseline dataset 120, the third baseline dataset 122, another baseline dataset, or does not approximate any one of these orientations at block 508.

Depending on the orientation detected by the processor 124, the processor 124 may change the operating mode of the mobile device 102. Where the detected orientation of the mobile device 102 approximates the orientation represented by the second baseline dataset 120, the processor 124 may change the operating mode of the mobile device 102 from the first operating mode, such as the voice input mode, to the second operating mode, such as the augmented reality display mode as shown at block 510. Where the detected orientation of the mobile device 102 approximates the orientation represented by the third baseline dataset 122, the processor 124 may change the operating mode of the mobile device 102 from the first operating mode, such as the voice input mode, to the third operating mode, such as the reading display mode as shown at block 512. Moreover, should the orientation detected by the processor 124 not approximate one or more of the orientations represented by any of the baseline datasets, the processor 124 may change the operating mode of the mobile device 102 from the first operating mode to a default operating mode or processor 124 may not change the operating mode of the mobile device 102 as shown at block 518.

When the processor 124 changes the operating mode of the mobile device 102 from the voice input mode to the augmented reality display mode, the processor 124 may display one or more augmented reality images on the display 112 of the mobile device 102 as shown at block 514. Placing the mobile device 102 in the augmented reality display mode may also include activating one or more components of the mobile device 102, such as the camera 108 for recording images for display on the display 112 of the mobile device 102. As mentioned above, when the mobile device 102 is operating in the augmented reality display mode, the images recorded by the camera 108 may be overlaid with one or more computer-generated graphic elements, such as labels, icons, software buttons, two-dimensional or three-dimensional computer-generated images, or any other type of computer-generated graphic elements. The computer-generated graphic elements may be distinguished from the images recorded by the camera 108 because the computer-generated graphic elements may not be physically present in the environment in which the mobile device 102 operates.

Moreover, one or more of the computer-generated graphic elements may correspond to the results output by the mobile application based on the voice input previously provided by the user. For example, when a user searches for a business and provides the mobile application with the address of the business, the augmented reality display mode may include displaying the building of the business recorded by the camera 108 on the display 112 along with a computer-generated outline overlaid on the building to distinguish this building from other buildings in the environment. In another example, when a user requests directions to a particular location from the mobile application, the augmented reality display mode may include displaying a road on which the user is standing recorded by the camera 108 overlaid with a computer-generated arrow pointing in the direction that the user should travel to reach the requested location. By overlaying the images recorded by the camera 108 with computer-generated elements that correspond to one or more results output by the mobile application, a user may gain a better understanding of the results of the mobile application as they relate to the user's environment.

When the processor 124 changes the operating mode of the mobile device 102 from the voice input mode to the reading display mode, the processor 124 may display the results output from the mobile application on the display 112 of the mobile device 102 in a preselected format at block 514. The preselected format may include a list format, an outline format, a graphical format, a combination of these formats, or any other type of format. The user or the processor 124 may calibrate the reading display mode such that the results displayed in the reading display mode are legible when viewed in the environment in which the mobile device 102 is operating. An example of calibrating the reading display mode is adjusting the contrast or brightness of the display 112 of the mobile device 112. Another example of calibrating the reading display mode is selecting a font for displaying the words of the results output by the mobile application. Other examples of calibrating the reading display mode are also possible. In other words, the reading display mode is an operating mode of the mobile device 102 that facilitates easily and legibly conveying the results of the mobile application to the user.

The systems, components, and logic described above may be implemented in many different ways, including a combination of hardware and software, or as software for installation on any desired operating system including Linux, UNIX, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media. The machine-readable media may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network.

The systems may be implemented in software, hardware, or a combination of software and hardware. The systems may be implemented in a computer programming language, such as C# or Java, or any other computer programming language now known or later developed.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

Although aspects of the invention herein have been described with reference to particular embodiments, it is to be understood that these embodiments are merely illustrative of the principles and applications of the present invention.

It is therefore to be understood that numerous modifications may be made to the illustrative embodiments and that other arrangements may be devised without departing from the spirit and scope of the invention as defined by the appended claims. Furthermore, while certain operations and functions are shown in a specific order, they may be performed in a different order unless it is expressly stated otherwise.

What is claimed is:

1. A method comprising:
   receiving, by a processor and from an orientation sensor, a first set of orientation data representative of a mobile computing device being in a first orientation;
   receiving, by the processor and from the orientation sensor, a second set of orientation data representative of the mobile computing device being in a second orientation;

changing, by the processor, an operational mode of the mobile computing device from a first operational mode to a second operational mode, the changing responsive to:
determining that the first set of orientation data approximates a first set of baseline data representative of a first state of the mobile computing device, the first state of the mobile computing device comprising an input receiving mode operative to receive voice input from a user, and
determining that the second set of orientation data approximates a second set of baseline data representative of a second state of the mobile computing device, the second state of the mobile computing device comprising a visual display mode operative to display a selected portion of a real-world environment overlaid by a computer-generated graphic element;
receiving, by the processor and while the mobile computing device is in the first operational mode, an indication of voice input;
outputting, by the processor and for display while the mobile computing device is in the second operational mode, a selected portion of a real-world environment physically located around the mobile computing device and a computer-generated graphic element overlaid on the displayed portion of the real-world environment, the computer-generated graphic comprising a visual indication of a search result, wherein the search result is determined responsive to a query based on the indication of the voice input.

2. The method of claim 1, wherein the second state of the mobile computing device comprises the mobile computing device being in the second operational mode.

3. The method of claim 1, wherein the first set of orientation data indicates that a front surface of the mobile computing device is positioned approximately against a head of the user.

4. The method of claim 1, wherein the second set of orientation data indicates that a front surface of the mobile computing device is approximately perpendicular to a ground surface.

5. The method of claim 1, wherein the second set of orientation data indicates that a front surface of the mobile computing device forms an approximate acute angle to a ground surface.

6. The method of claim 1, further comprising:
receiving, by the processor and from the orientation sensor, a set of transitional orientation data representative of transitional orientations of the mobile computing device;
wherein the changing of the operational mode of the mobile computing device from the first operational mode to the second operational mode is further responsive to determining that the set of transitional orientation data approximates a third set of baseline data representative of a transition of the mobile computing device from the first state to the second state.

7. The method of claim 1, wherein the selected portion of the real-world environment surrounding the mobile computing device is displayed in real-time.

8. The method of claim 1, wherein the selected portion of the real-world environment surrounding the mobile computing device was previously recorded and stored in a storage device.

9. The method of claim 1, the indication of the voice input associated with an address, the search result comprising an indication of a building associated with the address, wherein the displayed portion of the real-world environment comprises at least a portion of the building and the computer-generated graphic element includes a visual indication of the building.

10. The method of claim 1, the indication of the voice input associated with a destination different than a current location of the mobile computing device, wherein the computer-generated graphic element includes a visual indication of a direction to travel in order to reach the destination.

11. A non-transitory computer-readable medium that stores instructions that, when executed by a processor of a mobile computing device, cause the mobile computing device to perform a method comprising:
receiving, by the processor and from an orientation sensor, a first set of orientation data representative of the mobile computing device being in a first orientation;
receiving, by the processor and from the orientation sensor, a second set of orientation data representative of the mobile computing device being in a second orientation;
changing, by the processor, an operational mode of the mobile computing device from a first operational mode to a second operational mode, the changing responsive to:
determining that the first set of orientation data approximates a first set of baseline data representative of a first state of the mobile computing device, the first state of the mobile computing device comprising an input receiving mode operative to receive voice input from a user, and
determining that the second set of orientation data approximates a second set of baseline data representative of a second state of the mobile computing device, the second state of the mobile computing device comprising a visual display mode operative to display a selected portion of a real-world environment overlaid by a computer-generated graphic element;
receiving, by the processor and while the mobile computing device is in the first operational mode, an indication of voice input;
outputting, by the processor and for display while the mobile computing device is in the second operational mode, a selected portion of a real-world environment physically located around the mobile computing device and a computer-generated graphic element overlaid on the displayed portion of the real-world environment, the computer-generated graphic comprising a visual indication of a search result, wherein the search result is determined responsive to a query based on the indication of the voice input.

12. The non-transitory computer-readable medium of claim 11, wherein the second state of the mobile computing device comprises the mobile computing device being in the second operational mode.

13. The non-transitory computer-readable medium of claim 11, wherein the first set of orientation data indicates that a front surface of the mobile computing device is positioned approximately against a head of the user.

14. The non-transitory computer-readable medium of claim 11, wherein the second set of orientation data indicates that a front surface of the mobile computing device is approximately perpendicular to a ground surface.

15. The non-transitory computer-readable medium of claim 11, wherein the second set of orientation data indicates that a front surface of the mobile computing device forms an approximate acute angle to a ground surface.

16. The non-transitory computer-readable medium of claim 11, the method further comprising:

receiving, by the processor and from the orientation sensor, a set of transitional orientation data representative of transitional orientations of the mobile computing device;

wherein the changing of the operational mode of the mobile computing device from the first operational mode to the second operational mode is further responsive to determining that the set of transitional orientation data approximates a third set of baseline data representative of a transition of the mobile computing device from the first state to the second state.

17. The non-transitory computer-readable medium of claim 11, wherein the selected portion of the real-world environment surrounding the mobile computing device is displayed in real-time.

18. The non-transitory computer-readable medium of claim 11, wherein the selected portion of the real-world environment surrounding the mobile computing device was previously recorded and stored in a storage device.

19. The non-transitory computer-readable medium of claim 11, the indication of the voice input associated with an address, the search result comprising an indication of a building associated with the address, wherein the displayed portion of the real-world environment comprises at least a portion of the building and the computer-generated graphic element includes a visual indication of the building.

20. The non-transitory computer-readable medium of claim 11, the indication of the voice input associated with a destination different than a current location of the mobile computing device, wherein the computer-generated graphic element includes a visual indication of a direction to travel in order to reach the destination.

* * * * *